April 29, 1958
O. H. SCHUCK
2,832,552
CONTROL APPARATUS FOR AIRCRAFT
Filed Feb. 18, 1953
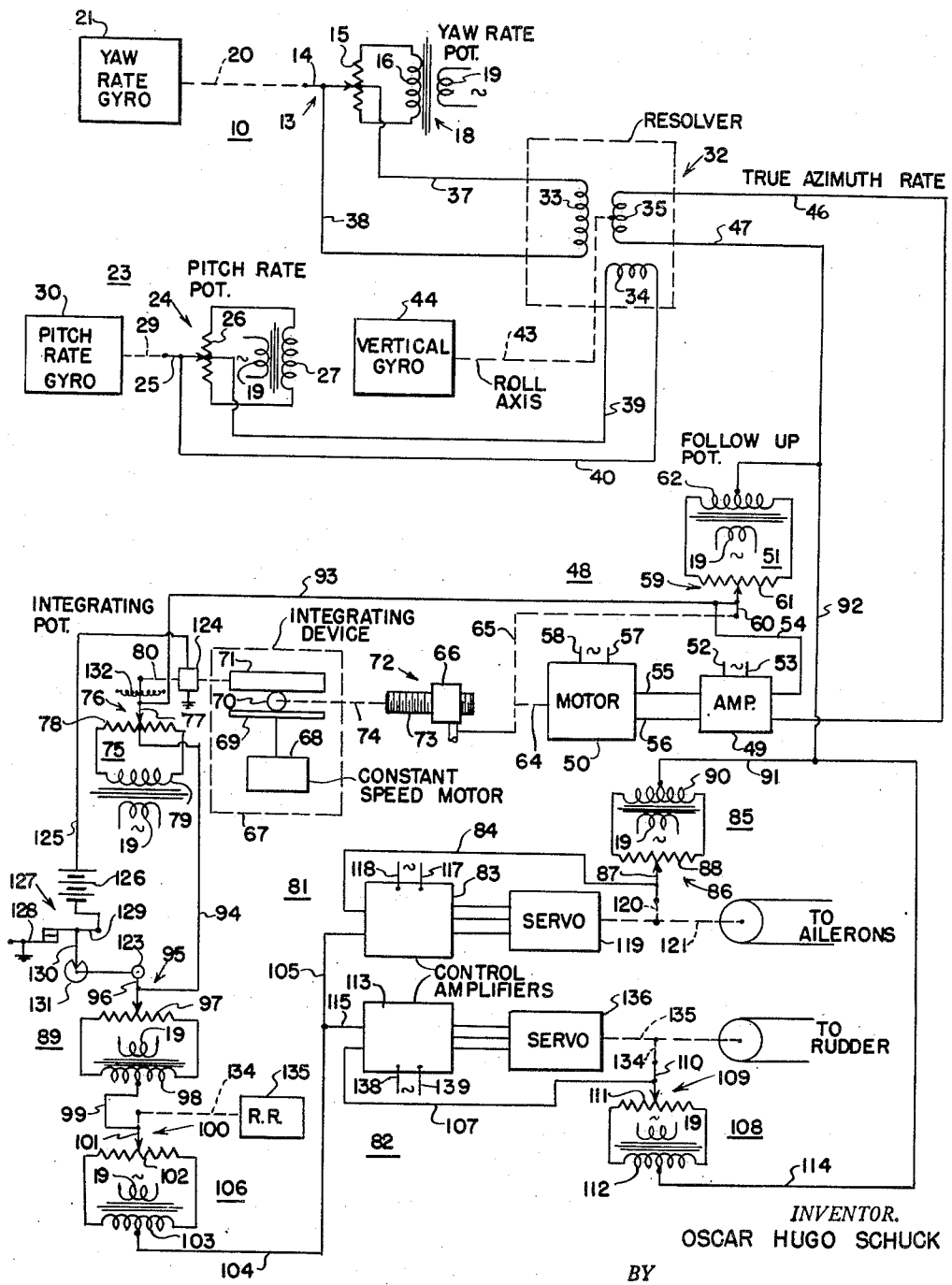
INVENTOR.
OSCAR HUGO SCHUCK
BY
George H. Fisher
ATTORNEY

United States Patent Office 2,832,552
Patented Apr. 29, 1958

2,832,552

CONTROL APPARATUS FOR AIRCRAFT

Oscar Hugo Schuck, Minneapolis, Minn., assignor to Minneapolis-Honeywell Regulator Company, Minneapolis, Minn., a corporation of Delaware Application February 18, 1953, Serial No. 337,467

12 Claims. (Cl. 244—77)

This invention pertains to aircraft control devices, and more particularly to apparatus for operating the control surfaces of an aircraft for stabilizing or controlling aircraft in flight, such apparatus being known in the art as an automatic pilot.

Heading stabilization of an aircraft in flight is achieved by means of an automatic pilot which includes a device responsive to change in heading and conventionally additionally includes a device responsive to the rate of change in heading. The rate of change of heading of the aircraft is often times derived from a rate of turn gyroscope.

Rate of turn gyroscopes as conventionally employed to measure rate of change of heading actually measures the rate of angular movement of an aircraft about its vertical axis. This rate of angular movement however when the aircraft is in a banked attitude is not the true rate of change of heading of the aircraft or in other words is not the aircraft true rate of change of azimuth. This will become apparent for while such conventional gyroscope may provide a true heading rate with the craft wings level, it is further apparent that when the craft is in extreme banked position such as a 90° bank angle that the conventional heading rate gyroscope provides no control effect whatsoever on the automatic pilot for the aircraft.

When the aircraft additionally includes a rate of pitch gyroscope which normally responds to the angular rate of the craft rotation about its lateral axis, when the craft is in a 90° bank attitude the pitch rate gyroscope provides an output which is actually the rate of change in heading of the aircraft. With a combination of a rate gyroscope responsive to rate of angular movement of a craft about its vertical axis and a second rate gyroscope responsive to the angular rate of the craft about the lateral axis the azimuth rate of the craft is obtained irrespective of the extreme positions, level or 90° bank of the craft. By modifying the output of the vertical axis rate gyroscope in accordance with the cosine of the angle of bank of the aircraft and by modifying the lateral axis rate gyroscope output in accordance with the sine of the angle of bank of the aircraft and combining the two modified angular rate signals there is further provided a resultant output which is at all times, irrespective of the various magnitudes in the bank angle of the aircraft, proportional to the true heading rate or true rate of change of azimuth of the craft with respect to the earth.

An object therefore of this invention is to obtain from two rate of change in angular position gyroscopes a measure of the true heading rate of an aircraft.

It is a further object of this invention to obtain from one rate of turn gyroscope sensing angular rate of an aircraft about its vertical axis and a second rate of turn gyroscope sensing angular rate of the craft about its lateral axis a measure of the true rate of change in azimuth of the craft.

It is a further object of this invention to provide a signal proportional to the angular rate of the craft about its vertical axis and a signal proportional to the angular rate of the craft about its lateral axis and to modify both said angular rate signals in proportion to the attitude of the craft about its longitudinal axis to provide a true azimuth angular rate of the craft.

A further object of this invention is to provide a heading stabilization arrangement for an aircraft including a device operated by rate of turn gyroscopes in which device errors in the output of the gyroscopes which errors are caused by bank of the craft on which they are supported are corrected.

A further object of this invention is to provide for the change in azimuth of a banked aircraft at a selected true azimuth rate.

The above objects and other advantages will become apparent from a consideration of the following specification, taken in connection with the accompanying drawing wherein:

The sole figure is a schematic arrangement of a control system for an aircraft for operation of the aileron and rudder surfaces thereof including the novel arrangement of the turn rate and pitch rate gyroscopes.

According to the invention, one rate of turn gyroscope is supported on the aircraft to respond to movement of the craft about its vertical axis and supplies one control signal. A second rate gyroscope is mounted on the craft to respond to angular rate of the craft about its lateral or pitch axis to provide a second signal. The first and second signals are applied separately to input windings of a resolver which are 90° displaced. Coacting with the two windings of the resolver is a rotatable output winding positioned in accordance with the bank attitude of the aircraft so that a resultant signal is induced in the rotatable winding proportional to the first signal multiplied by the cosine of the bank angle and to the second signal multiplied by the sine of the bank angle. The resultant signal is the true rate of change of heading of the aircraft and is used as one input to an integrating device. The output of the integrating device is the integral of the true rate of change of azimuth of the aircraft and thus a measure of the heading deviation of the aircraft. The integrated signal is applied to the aileron and rudder control channels of an automatic pilot to effect operation of the aileron and rudder control surfaces to correct for the heading deviation or to allow the achievement of a called-for heading displacement.

Referring to the drawing, a control signal proportional to the angular rate of the craft about its vertical axis is provided by a turn rate signal generator 10. The signal generator comprises a signal voltage potentiometer 13 comprising a slider 14 and resistor 15. The resistor 15 is energized from a secondary winding 16 of a transformer 18. The transformer includes a primary winding 19 connected to a suitable supply. The slider 14 is moved along resistor 15 from the electrical center thereof in either direction from an operating connection 20 extending between the slider 14 and a yaw rate gyroscope 21. The yaw rate gyroscope is of the type well known in the art and comprises a rotor freely mounted for rotation about its spin axis and also having angular movement about a second axis at right angles to the spin axis, the movement about the second axis being restrained by spring means or its equivalent. The gyroscope 21 is so mounted on the craft as to respond to the angular rate of the craft about its vertical axis and displace the slider 14 relative to resistor 15 in accordance with the angular rate.

A second control signal is provided by a signal generator 23 comprising, a potentiometer 24 having a slider 25 and a resistor 26 which is connected across a secondary winding 27. The winding 27 constitutes a second secondary winding of transformer 18 and thus has a common primary winding 19 with secondary winding 16.

The slider 25 is positioned along resistor 26 in either direction from a center tap thereof. This displacement is provided by an operating connection 29 extending between slider 25 and a craft lateral axis angular rate gyroscope 30. The gyroscope 30 is similar to the gyroscope 21 but it is arranged on the aircraft to respond to the rate of change in angular position of the aircraft about its lateral or pitch axis. Thus gyroscope 30 senses the pitch rate of the aircraft and adjusts slider 25 relative to resistor 26 accordingly.

A resolver 32 modifies the first two signals to provide a resultant true azimuth rate signal. The resolver 32 comprises a pair of fixed windings 33 and 34 angularly displaced so as to be mutually non-inductive. The resolver additionally includes a rotatable winding 35 inductively arranged relative to the fixed windings and in its central position for zero bank has its maximum coupling to winding 33 and minimum coupling with winding 34, and in its two extreme positions for maximum right or left bank has its maximum coupling with winding 34 and minimum coupling with winding 33. Winding 33 is energized in accordance with rate of turn of the craft about its vertical axis by connecting one end of winding 33 through a conductor 37 to a center tap of resistor 15 and connecting the opposite end of winding 33 through a conductor 38 to slider 14. Winding 34 is energized in accordance with the pitch axis angular rate by connecting one end of winding 34 through conductor 39 to the center tap of resistor 26 and connecting the opposite end of winding 34 to slider 25 through conductor 40. The rotatable winding 35 is positioned from a vertical gyroscope 44 through an operating connection 43 in accordance with the bank or lateral attitude of the aircraft. The gyroscope 44 is of a conventional type having a rotor with three axes of freedom with its spin axis vertical and the remaining two axes respectively perpendicular to each other and in a horizontal plane. The gyroscope is so mounted on the craft that as the craft changes attitude about its longitudinal or bank axis, the winding 35 is rotated from a position where it has its maximum inductive coupling with winding 33 toward a position where it has its maximum coupling with winding 34. It is thus apparent that the portion of the resultant voltage induced in winding 35 from winding 33 is proportional to the rate of turn of the yaw rate gyroscope multiplied by the cosine of the bank angle of the craft and that the portion of the resultant voltage in winding 35 induced from winding 34 is proportional to the rate of pitch attitude change rate in the aircraft multiplied by the sine of the bank angle of the craft.

The resultant electrical voltage signal in winding 35 is converted into a mechanical displacement by a follow-up system 48. The system 48 comprises an amplifier 49, a motor 50, and a rebalancing network 51. The amplifier 49 may be of the electronic type more commonly referred to as an A. C. discriminator type having input connections 52, 53 energized from a source of alternating voltage and a pair of control electrodes connected to a signal input circuit. The signal input circuit extends from one amplifier control electrode, conductor 46, winding 35, conductor 47, rebalancing network 51, conductor 54, to the second amplifier control electrode. The motor 50 may be a two-phase type A. C. induction motor having one winding connected by conductors 57, 58, to the source of alternating voltage and its other winding connected to the output conductors 55, 56 of amplifier 49. The motor 50 rotates in one direction or another depending upon the phase relationship between the control signal applied to the electrodes of amplifier 49 and the voltage from the supply applied across conductors 52, 53.

The network 51 comprises a follow-up potentiometer 59 having a slider 60 and resistor 61. Resistor 61 is energized by connecting it across a secondary winding 62 of the transformer 18. The slider 60 is positioned along resistor 61 by an operating connection 65 extending between the slider and the output shaft 64 of motor 50. Thus it will be seen that when a voltage is generated in winding 35 the amplifier 49 effects operation of motor 50 which through its output shaft 64 positions the slider 60 to develop a rebalance signal in the control circuit of amplifier 49 whereby the shaft 64 of the motor 50 is rotated proportional to the signal in winding 35. The displacement of shaft 64 is thus in proportion to the true azimuth rate of the craft.

The azimuth rate of the aircraft is supplied to an integrating device 67 which supplies an output proportional to the time integral of azimuth rate, that is, to the rate of change in azimuth of the craft. Integrating device 67 may be a conventional ball, disc, cylinder arrangement wherein a constant speed motor 68 rotates a disc 69 which drives through an adjustable ball carriage 70, a cylinder 71. The speed at which the cylinder 71 rotates depends upon the radial position of the ball carriage 70 and this ball carriage is positioned radially of the disc 69 by the output shaft 64 through a suitable positioning means 72. The positioning means 72 may consist of a shaft 74 which positions the ball carriage 70, being threaded at one end 73 and engaging an internally threaded member 66 rotated by the motor output shaft 64. The cylinder 71 therefore rotates in accordance with the time integral of the rate of change of azimuth of the craft.

The displacement of cylinder 71 is converted into an electrical signal through a network 75. The network 75 consists of a potentiometer 76 having a slider 77 and resistor 78. The resistor 78 is connected across a secondary winding 79 of the transformer 18. Slider 77 is positioned along resistor 78 in either direction from a center tap thereof by an operating connection 80 extending between slider 77 and cylinder 71.

The voltage supplied from the network 75 which is proportional to the true azimuth change in heading of the craft and the voltage from network 51 which is proportional to the true azimuth rate of change of heading of the craft are applied in the control circuits 81, 82 of a pair of phase sensitive amplifiers 83, 113. The control circuit of amplifier 83 extends from one control electrode thereof, conductor 84, follow-up network 85, conductor 91, conductor 92, network 51, conductor 93, network 75, conductor 94, a manual turn control network 89, conductor 99, a craft roll rate network 106, conductor 104, conductor 105 to the other control electrode of amplifier 83. Similarly the control circuit for amplifier 113 extends from one control electrode in the amplifier via conductor 107, rebalancing network 108, conductor 114, conductor 92, network 51, conductor 93, network 75, conductor 94, manual turn control network 89, conductor 99, roll rate network 106, conductor 104, conductor 115, to the other control electrode of the amplifier. The amplifier 83 additionally includes alternating voltage input connections 117, 118 from the supply source. The amplifier 83 controls the direction of operation of the aileron servomotor 119 with the direction of operation being dependent upon the phase relationship of the instantaneous control signal applied to the control electrodes of amplifier 83 with respect to the voltage across the conductors 117, 118. The amplifier-servomotor combination may be of the type disclosed in Patent 2,435,734 to Willis H. Gille et al., and reference may be made thereto for the details of the construction of the amplifier and servomotor. The follow-up signal generator 85 of the amplifier control circuit 81 comprises a follow-up potentiometer 86 having a slider 87 and resistor 88 which is connected across a secondary winding 90 of the transformer 18. The slider 87 is positioned along resistor 88 by a suitable operating connection 120 extending from the output shaft 121 of the servomotor 119. The manually operable called-for rate of turn signal generator 89 comprises a manually operable potentiometer 95 having a slider 96 and a resistor 97 which is connected across a secondary winding 98 of the transformer 18. The slider 96 is positioned along resistor 97 by a manually operable knob 123 to effect selected rates of change of azimuth of the craft. During the time that slider 96 is displaced from its center position, the network 75 is rendered ineffective to oppose the changes in heading of the craft so ordered. For this purpose, the integrating device has its driven roller 71 disconnected from slider 77 and the slider 77 is moved to a center position on resistor 78 as follows. Slider 77 is positioned from cylinder 71 through the operating connection 80 that includes a magnetic clutch 124. The clutch receives its energization from a control circuit including conductor 125, battery 126, a mechanically operated switch 127, comprising switch arms 129, 128 to ground, and to the ground side of the clutch 124. The switch arm 128 is fixed and the arm 129, normally engaged therewith is movable. Extending from arm 129 is a cam follower 130 which normally engages a depressed part of cam 131 when the contacts of arms 128, 129 are engaged and slider 96 is centered. Upon movement of the slider 96, the follower 130 engages a higher peripheral portion of cam 131 to separate the contacts of arms 128, 129 to deenergize the clutch 124. Upon deenergization of the clutch, spring centering means 132 between the slider and frame move the slider 77 to its center position on resistor 78. The roll rate generator 106 comprises a craft roll rate potentiometer 100 having a slider 101 and resistor 102 which is connected across a secondary winding 103 of the transformer 18. The slider 101 is positioned along resistor 102 from the center thereof in either direction depending upon the rate of roll of the craft. This movement is effected by a suitable operating connection 134 connecting slider 101 with a rate of roll gyroscope 135 of a conventional type.

The follow-up network 108 in amplifier control circuit 82 comprises a rebalance potentiometer 109 having a slider 110 and resistor 111 which is connected across a secondary winding 112 of the transformer 18. Slider 110 is positioned along resistor 111 by a suitable operating connection 134 connecting it with the output shaft 135 of the rudder servomotor 136. The servomotor 136 operates the rudder of the craft and is reversibly controlled from amplifier 113. The direction of rotation of this motor depends upon the instantaneous phase relationship of the input control signal across the control electrodes of the amplifier and the voltage across the amplifier power supply conductors 138, 139. The amplifier and rudder servomotor combination may be similar to that used for operation of the aileron surfaces. The remaining networks in the control circuit 82 of amplifier 113 are common to the amplifier control circuit 81 and have been heretofore described.

In operation, if an external disturbance causes the craft to bank and change heading, the yaw rate gyroscope 21 displaces slider 14 relative to the center tap of resistor 15 in a direction and magnitude depending upon the rate of yaw of the craft. The voltage developed in potentiometer 13 is applied to the winding 33. Simultaneously with the craft so banked, the gyroscope 30 displaces slider 25 relative to resistor 26 to supply a pitch rate signal to winding 34. The resolver winding 35 is rotated in accordance with the bank angle of the aircraft from the gyroscope 44 sensing craft attitude about the roll axis. The resultant signal induced in winding 35 is thus proportional to the rate of change of azimuth of the craft. This signal is applied to the amplifier 49 which effects operation of the motor 50. Through its follow-up arrangement 51, the motor 50 positions its output shaft 64 in proportion to the true rate of change of azimuth of the craft. The shaft 64 positions the ball carriage 70 radially with respect to the center of the disc 69 proportional to the azimuth rate, and the output of the integrating device 67—as reflected by the displacement of the slider 77 of potentiometer 76—is proportional to the change in azimuth of the aircraft since it is a time integral of the rate of change of azimuth of the craft. The azimuth change signal from potentiometer 76, together with signals from networks 51, 89, and 106, is applied in parallel to the aileron and rudder control circuits for amplifiers 83 and 113 to effect operation of the aileron and rudder servomotors 119, 136. Through their follow-up arrangements 120 and 134 the servomotors position their respective control surfaces in proportion to the azimuth deviation of the aircraft, and certain of its derivatives, as required for stability. Under the applied ailerons and rudder, the aircraft is returned to its original heading.

When changes in heading are to be effected by manual selection, the manual turn control knob 123 is adjusted to either side of its center position to select the desired direction of the turn and the displacement of the slider sets up the desired rate of change in azimuth of the craft to be made while in a banked turn. The operation of slider 96 will open switch contacts 128 and 129 to deenergize the clutch 124 and effect centering of slider 77. The adjustment of slider 96 provides a control signal into circuits 81 and 82 of the aileron and rudder amplifiers 83, 113. The unbalance in circuits 81, 82 will effect operation of the aileron servomotor 119 and rudder servomotor 136 and place the craft in a banked turn. As the craft rolls about its longitudinal axis into the banked attitude, the rate of roll gyroscope 135 displaces its slider 101 which at this time in so far as the rudder channel is concerned tends to overcome the usual adverse yaw arising because of deflection of the ailerons. The craft will effect the turn at an increasing rate of change of azimuth until the output voltage from network 51 which is the actual azimuth change rate of the craft balances the voltage from the selected turn control network 89. At this time, the aircraft has its rate of turn stabilized by the network 51 and executes a true called for rate of change of heading as selected by the turn control knob 123. Thus by maintaining the selected true azimuthal rate of change for a certain time a certain or desired extent of change of heading is undergone which is independent of air speeds of the craft.

While a preferred embodiment of the invention has been considered, many changes therein will now suggest themselves and thus many apparently widely different embodiments of this invention could be made without departing from the scope thereof. It is intended therefore, that the matter contained in the above description and shown in the accompanying drawing shall be considered as illustrative of the invention and not in a limiting sense.

What is claimed is:

1. In flight control apparatus for an aircraft having aileron and rudder operating means, in combination: a rate of turn gyroscope responsive to velocity of turn about the craft vertical axis, a rate of turn gyroscope responsive to velocity of turn of the craft about the craft lateral axis, signal generating means operated by each gyroscope, a craft roll attitude sensing device, signal combining means connected to the signal generating means and operated by said device for modifying both generated signals in accordance with said craft roll attitude to provide a resultant signal proportional to the azimuthal rate of turn of the craft about an axis perpendicular to the earth, and control means connected to the combining means for controlling the aileron and rudder operating means in accordance with said resultant signal.

2. The apparatus of claim 1 wherein said control means includes further means for integrating the azimuth rate signal.

3. Apparatus for providing a signal proportional to the true azimuthal rate of a banked craft, said apparatus comprising: a gyroscope responsive to craft angular rate about its vertical axis, a first variable signal providing means positioned by the gyroscope a second gyroscope responsive to craft angular rate about its lateral axis, a second variable signal providing means positioned by the second gyroscope a resolver having a pair of windings angularly displaced and respectively energized in proportion to the first and second signal corresponding to craft rate about the two axes, a craft bank sensing device, a third winding of said resolver inductively coupled to the pair of windings, and means for relatively adjusting the third winding relative to the pair of windings from the bank sensing device.

4. In an automatic pilot for an aircraft having a control surface for controlling heading of said craft about an axis related to the earth, a servomotor adapted to actuate said surface, control means for said servomotor, means for providing a resultant signal proportional to the rate of change of heading of said craft relative to the earth related axis and connected to said control means said signal providing means comprising a first signal providing device responsive to rate of turn of said craft about its vertical axis, a second signal providing device responsive to rate of turn of said craft about its pitch axis, and further resolver means having two primary and one secondary winding with the primary windings connected to the signal producing devices and the secondary winding rotated relative to the primary windings in accordance with the bank attitude of said craft for varying the relative effects of said two signal providing devices on said resultant signal.

5. Control apparatus for an aircraft having a rudder surface and aileron surfaces, in combination: a servomotor adapted to position said rudder surface, a servomotor adapted to position said aileron surfaces, a signal responsive means for reversibly controlling said rudder servomotor, a signal responsive means for reversibly controlling said aileron servomotor, means for producing a signal proportional to the rate of angular movement of the craft about its normal vertical axis, means for producing a signal proportional to the rate of angular movement of the craft about its pitch axis, craft bank attitude responsive means for modifying both rate signals one signal being modified in accordance with the sine of the bank angle of the craft relative to the surface of the earth and the other signal being modified in accordance with the cosine of the bank angle said modified signals together defining the true craft azimuth rate, and means for controlling both signal responsive means from both modified control signals whereby the craft executes a banked turn about an axis related to the earth.

6. In control apparatus for an aircraft movable about its three respectively perpendicular axes lying in the plane of the aircraft, said aircraft having control surfaces for controlling the attitude of said craft about a first and second axis thereof respectively, in combination: a first servomotor adapted to position a surface to control attitude of the craft about the first axis, a second servomotor adapted to position other surfaces for controlling the craft attitude about the second axis, means for producing a signal proportional to the rate of movement of the craft about its first axis, means for producing a second signal proportional to the rate of movement of the craft about its third axis, a control means for the first servomotor, a control means for the second servomotor, and attitude responsive means connected to both signal producing means for supplying each of said rate of movement signals to both control means in amounts dependent upon the angular position of the craft about its second axis.

7. In an automatic pilot for an aircraft having a first control surface for controlling attitude of said craft about a first axis thereof and a second control surface for controlling craft attitude about a second axis thereof, in combination: a servomotor adapted to position said first surface, a second servomotor adapted to position said second surface, a first and second potential responsive means for operating respectively said first and second servomotors, means responsive to the rate of angular movement of the craft about its said first axis for producing a first voltage signal, means responsive to the rate of angular movement of the craft about a third axis thereof for producing a second control signal voltage, attitude means connected to both voltage producing means for modifying said voltage signals respectively in accordance with the cosine and sine of the angular attitude of the craft about its said second axis with respect to the surface of the earth, and means for supplying both modified signals to each potential responsive means.

8. In control apparatus for an aircraft having a first control surface for altering the attitude of the craft about a first axis thereof and a second control surface for controlling the attitude of the craft about a second axis thereof, in combination: servomotors for operating said surfaces, a first device producing a voltage signal in accordance with the angular rate of movement of the craft about its said first axis, a second device for producing a voltage proportional to the rate of angular movement of the craft about a third axis thereof, a resolver comprising a pair of windings relatively angularly displaced and a third winding inductively associated with said pair of windings and rotatable relative thereto, means for energizing one of said pair of windings in accordance with said first signal, means for energizing the second of said pair of windings in accordance with the second signal, means for relatively rotating the pair of windings and third winding in accordance with the position of the craft about its second axis, potential responsive means for controlling said servomotors, and means for connecting said third winding of said resolver to said potential responsive means.

9. Control apparatus for an aircraft having a rudder control surface for controlling the craft about its vertical axis, in combination: a servomotor for positioning said rudder surface, signal responsive means for reversibly operating said servomotor, a gyroscope responsive to the rate of angular movement of the craft about its vertical axis, a gyroscope responsive to the rate of angular movement of the craft about its lateral axis, signal generating means operated by each angular rate of responsive gyroscope, and means for transmitting said signals to said signal responsive means said transmitting means being responsive to angular position of said craft about its longitudinal axis relative to a perpendicular from the earth, whereby control of said signal responsive means is effected by said angular rate about the vertical axis when the craft has no angular displacement about its roll axis and said signal responsive means is solely controlled from said lateral axis angular rate signal when the attitude of the craft about its longitudinal axis is 90° from the horizontal position.

10. The apparatus of claim 9 wherein the transmission means includes a resolver having a first and second winding relatively angularly displaced and a third winding inductively associated with said first and second windings and relatively rotatable with respect to the first and second winding in accordance with the relative angular position of the craft and the perpendicular from the earth and connected to said signal responsive means.

11. The apparatus of claim 9 wherein the transmission means for supplying a signal to said signal responsive means comprises means for modifying the vertical axis angular rate signal in accordance with the cosine of the angular position of the craft about its longitudinal axis relative to the perpendicular from the earth and means for varying the lateral axis angular rate signal in accordance with the sine of the angle of the craft about its longitudinal axis.

12. Flight control apparatus for an aircraft having control surfaces to place said craft in a banked turn about an axis vertical to the surface of the earth; said apparatus comprising: motor means operatively connected to said surfaces, balanceable control means connected to said motor means and effecting operation thereof on unbalance of said control means, manually operable means in said control means for providing an unbalance in said control means proportional to a selected azimuth change rate of the craft about said axis, a craft axis pitch rate gyroscope, a craft axis yaw rate gyroscope, a device responsive to the bank attitude of the craft relative to the vertical axis, resolver means connected to said two gyroscopes and said device for producing an unbalance in said control means proportional to the actual azimuthal change rate of the craft about said axis, said manually operable means and said resolver means having their effects in said control means connected in opposition, whereby the banked craft changes its azimuth heading at selected rates.

References Cited in the file of this patent

UNITED STATES PATENTS

| | | |
|---|---|---|
| 1,966,170 | Greene | July 10, 1934 |
| 2,361,790 | Noxon | Oct. 31, 1944 |
| 2,571,106 | Brannin | Oct. 16, 1951 |
| 2,597,789 | McGoldrick | May 20, 1952 |

FOREIGN PATENTS

| | | |
|---|---|---|
| 617,240 | Great Britain | Feb. 3, 1949 |
| 632,158 | Great Britain | Nov. 17, 1949 |
| 674,887 | Great Britain | July 2, 1952 |
| 973,421 | France | Sept. 13, 1950 |